US012596503B2

(12) United States Patent
Lee et al.

(10) Patent No.:  US 12,596,503 B2
(45) Date of Patent:       Apr. 7, 2026

(54) STORAGE DEVICE INITIALIZING E-FUSE REGION, AND METHOD OF OPERATING THE SAME

(71) Applicant: Samsung Electronics Co., Ltd., Suwon-si (KR)

(72) Inventors: Jangkwon Lee, Suwon-si (KR); Sun-Dong Kim, Suwon-si (KR); Hyunjoo Jung, Suwon-si (KR); Sung-Hwan Bae, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 82 days.

(21) Appl. No.: 18/635,752

(22) Filed: Apr. 15, 2024

(65) Prior Publication Data

US 2025/0156113 A1      May 15, 2025

(30) Foreign Application Priority Data

Nov. 9, 2023     (KR) ........................ 10-2023-0154442

(51) Int. Cl.
*G06F 3/06*               (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G11C 29/787; G11C 17/16; G11C 17/18
See application file for complete search history.

(56) References Cited

U.S. PATENT DOCUMENTS

| | | | |
|---|---|---|---|
| 10,192,620 | B2 | 1/2019 | Kim et al. |
| 10,606,698 | B2 | 3/2020 | Rayaprolu et al. |
| 11,132,312 | B2 | 9/2021 | Kim et al. |
| 11,221,912 | B2 | 1/2022 | Rayaprolu et al. |
| 11,550,654 | B2 | 1/2023 | He et al. |

(Continued)

FOREIGN PATENT DOCUMENTS

| | | |
|---|---|---|
| JP | 2018-022769 A | 2/2018 |
| KR | 10-2018-0085419 A | 7/2018 |

(Continued)

*Primary Examiner* — Sean D Rossiter
(74) *Attorney, Agent, or Firm* — Harness, Dickey & Pierce, P.L.C.

(57)                ABSTRACT

Disclosed is an operating method of a storage device which includes a non-volatile memory device and a storage controller. The method includes providing, by the storage controller, the non-volatile memory device with a first command indicating a target memory operation of user data, performing, by the non-volatile memory device, the target memory operation in a memory region based on the first command and first setting information stored in an E-fuse region, providing, by the non-volatile memory device, the storage controller with a first response indicating that the target memory operation fails, providing, by the storage controller, the non-volatile memory device with a second command indicating an initialization operation of the E-fuse region based on the first response, updating, by the non-volatile memory device, the first setting information of the E-fuse region based on the second command, so as to be changed to second setting information.

20 Claims, 11 Drawing Sheets

(56) References Cited

U.S. PATENT DOCUMENTS

| | | | |
|---|---|---|---|
| 12,124,702 B2 * | 10/2024 | Park | G11C 11/5642 |
| 12,471,291 B2 * | 11/2025 | Seo | H10B 61/10 |
| 2006/0114709 A1 * | 6/2006 | Yamada | G11C 11/22 |
| | | | 365/145 |
| 2017/0090909 A1 * | 3/2017 | Guo | G06F 8/66 |
| 2018/0040365 A1 | 2/2018 | Maki et al. | |
| 2018/0182469 A1 * | 6/2018 | Nagai | G11C 29/789 |
| 2022/0301631 A1 * | 9/2022 | Törnqvist | G11C 16/26 |
| 2022/0415408 A1 | 12/2022 | Park et al. | |
| 2024/0231987 A1 * | 7/2024 | Park | G06F 11/0727 |
| 2024/0412806 A1 * | 12/2024 | Hershman | G11C 29/027 |
| 2025/0190341 A1 * | 6/2025 | Hwang | G06F 11/1004 |

FOREIGN PATENT DOCUMENTS

| | | | |
|---|---|---|---|
| KR | 10-2021-0039075 A | 4/2021 | |
| KR | 10-2023-0001182 A | 1/2023 | |

* cited by examiner

FIG. 1

Neutrons
(Naturally Occurring)

FIG. 8

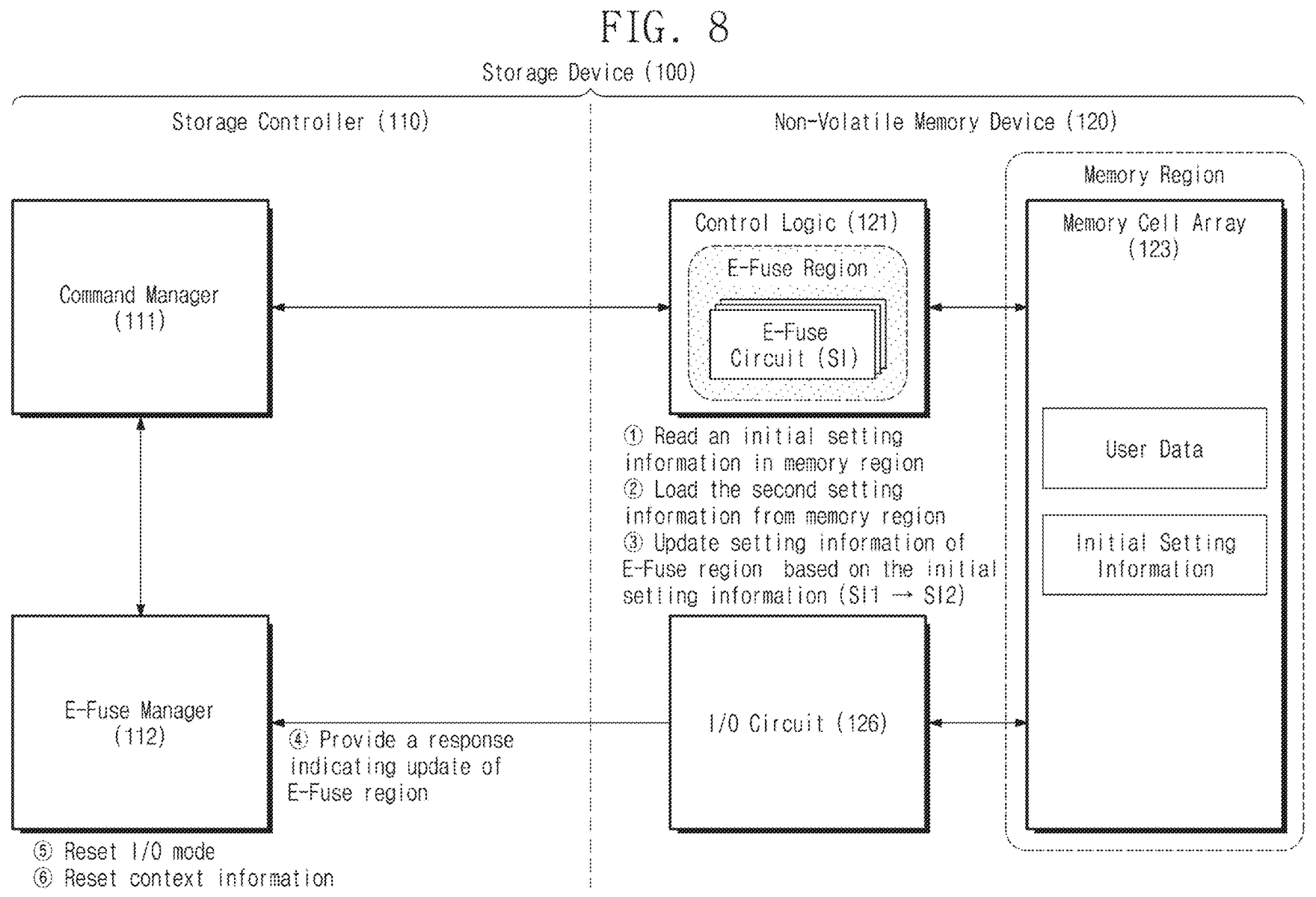

Storage Device (100)

Non-Volatile Memory Device (120)

Memory Region

Memory Cell Array (123)

User Data

Initial Setting Information

Control Logic (121)

E-Fuse Region

E-Fuse Circuit (S1)

I/O Circuit (126)

① Read an initial setting information in memory region
② Load the second setting information from memory region
③ Update setting information of E-Fuse region based on the initial setting information (SI1 → SI2)

Storage Controller (110)

Command Manager (111)

E-Fuse Manager (112)

④ Provide a response indicating update of E-Fuse region

⑤ Reset I/O mode
⑥ Reset context information

FIG. 9

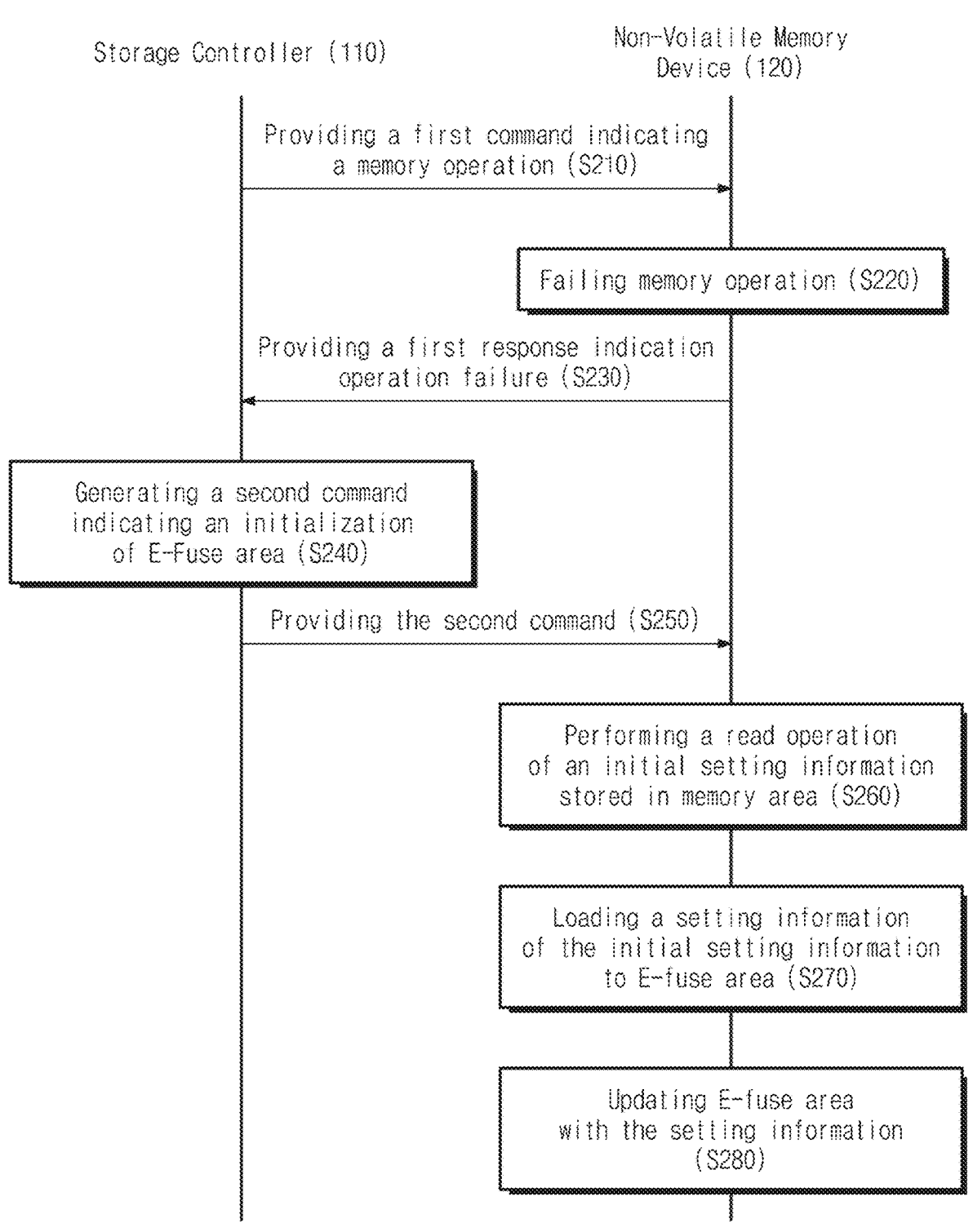

Storage Controller (110)                     Non-Volatile Memory
                                                  Device (120)

Providing a first command indicating
a memory operation (S210)

Failing memory operation (S220)

Providing a first response indication
operation failure (S230)

Generating a second command
indicating an initialization
of E-Fuse area (S240)

Providing the second command (S250)

Performing a read operation
of an initial setting information
stored in memory area (S260)

Loading a setting information
of the initial setting information
to E-fuse area (S270)

Updating E-fuse area
with the setting information
(S280)

STORAGE DEVICE INITIALIZING E-FUSE REGION, AND METHOD OF OPERATING THE SAME

CROSS-REFERENCE TO RELATED APPLICATIONS

This application claims priority under 35 U.S.C. § 119 to Korean Patent Application No. 10-2023-0154442 filed on Nov. 9, 2023, in the Korean Intellectual Property Office, the disclosures of which are incorporated by reference herein in their entireties.

BACKGROUND

Example embodiments of the present disclosure described herein relate to a storage device, and more particularly, relate to a storage device initializing an E-fuse region when a soft error occurs and an operating method thereof.

A memory device stores data in response to a write command and outputs data stored therein in response to a read command. However, a soft error occurs due to various factors such as a noise, an electromagnetic interference, and naturally occurring particles. The soft error may cause the failure of a memory operation.

In particular, even though the soft error occurs due to E-fuse circuits affected by the above factors, it may be difficult to identify the cause of the soft error, that is, it may be difficult to recover the soft error. In addition, when the memory device performs the memory operation in a state where the error is not recovered, an available area of the memory device gradually decreases.

SUMMARY

Example embodiments of the present disclosure provide a storage device initializing an E-fuse region when a soft error occurs such that the soft error does not again occur, and an operating method thereof.

According to an example embodiment, an operating method of a storage device which includes a non-volatile memory device including a memory region and an E-fuse region and a storage controller includes providing, by the storage controller, the non-volatile memory device with a first command indicating a target memory operation of user data, performing, by the non-volatile memory device, the target memory operation in the memory region based on the first command and first setting information stored in the E-fuse region, providing, by the non-volatile memory device, the storage controller with a first response indicating a failure of the target memory operation, providing, by the storage controller, the non-volatile memory device with a second command indicating an initialization operation of the E-fuse region based on the first response, updating, by the non-volatile memory device, the first setting information of the E-fuse region based on the second command, so as to be changed to second setting information, and providing, by the non-volatile memory device, the storage controller with a second response indicating that the E-fuse region is updated.

According to an example embodiment, an operating method of a storage controller which communicates with a non-volatile memory device includes providing a non-volatile memory device with a first command indicating a target memory operation of user data, receiving a first response indicating a failure of the target memory operation, from the non-volatile memory device, providing the non-volatile memory device with a second command indicating initialization of an E-fuse region of the non-volatile memory device based on the first response, and receiving a second response indicating that the E-fuse region is updated, from the non-volatile memory device.

According to an example embodiment, a storage device includes a storage controller, and a non-volatile memory device. The storage controller provides the non-volatile memory device with a first command indicating a target memory operation of user data. The non-volatile memory device includes a memory region and an E-fuse region and performs the target memory operation in the memory region based on first setting information stored in the E-fuse region. The storage controller receives a first response indicating a failure of the target memory operation, from the non-volatile memory device, and provides the non-volatile memory device with a second command indicating an initialization operation of the E-fuse region based on the first response. The non-volatile memory device updates the first setting information of the E-fuse region based on the second command, so as to be changed to second setting information, and provides the storage controller with a second response indicating that the E-fuse region is updated.

BRIEF DESCRIPTION OF THE FIGURES

The above and other objects and features of the present disclosure will become apparent by describing in detail example embodiments thereof with reference to the accompanying drawings.

FIG. 1 is a block diagram of a storage system according to an example embodiment of the present disclosure.

FIG. 8 is a diagram describing a method in which a storage device initializes an E-fuse region, according to some example embodiments of the present disclosure.

FIG. 9 is a flowchart describing a method in which a storage device initializes an E-fuse region, according to some example embodiments of the present disclosure.

DETAILED DESCRIPTION

Figure 2:
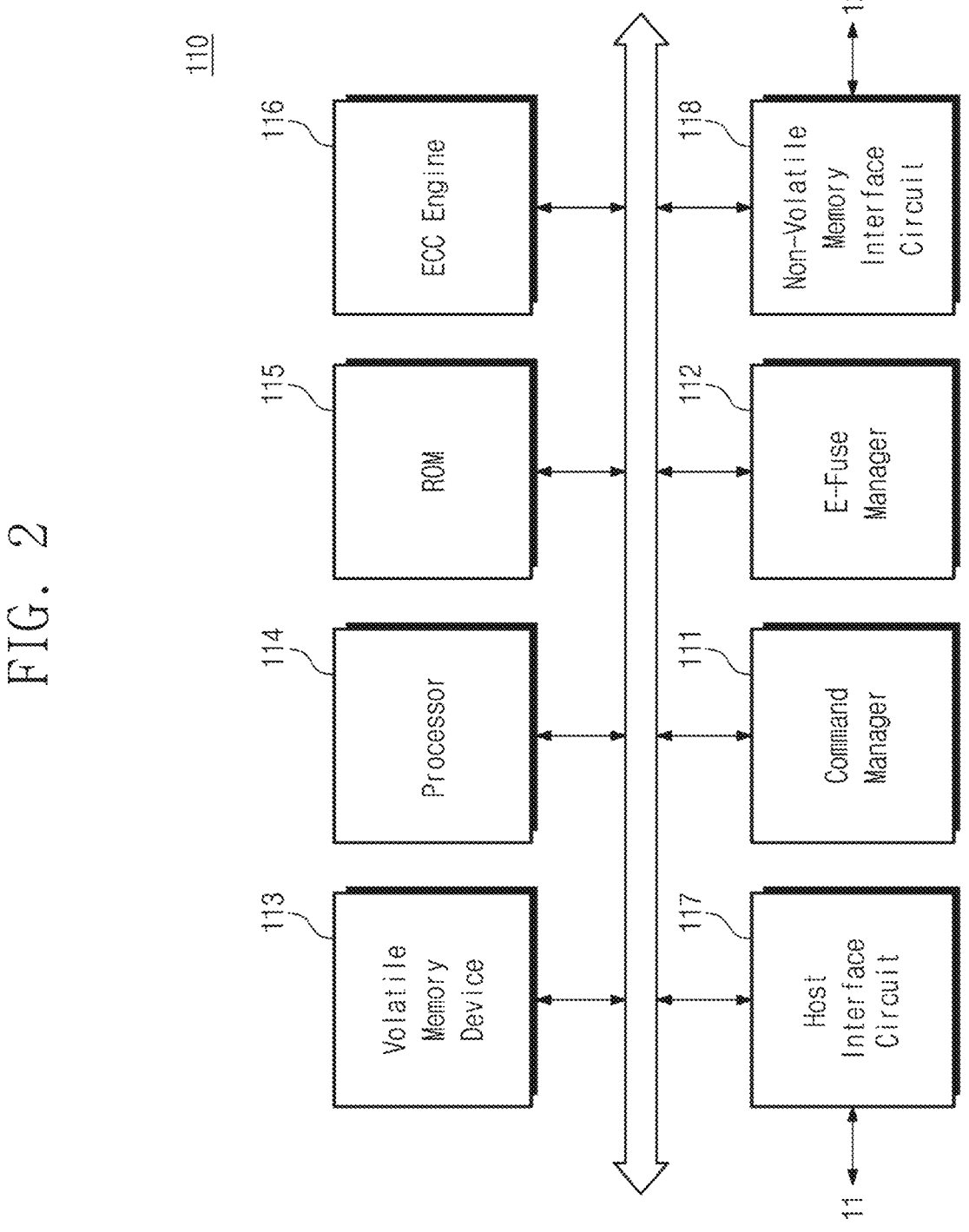
FIG. 2 is a block diagram illustrating a storage controller of FIG. 1 in detail, according to some example embodiments of the present disclosure.

Below, example embodiments of the present disclosure will be described in detail and clearly to such an extent that one skilled in the art carries out example embodiments of the present disclosure easily.

Figure 1:
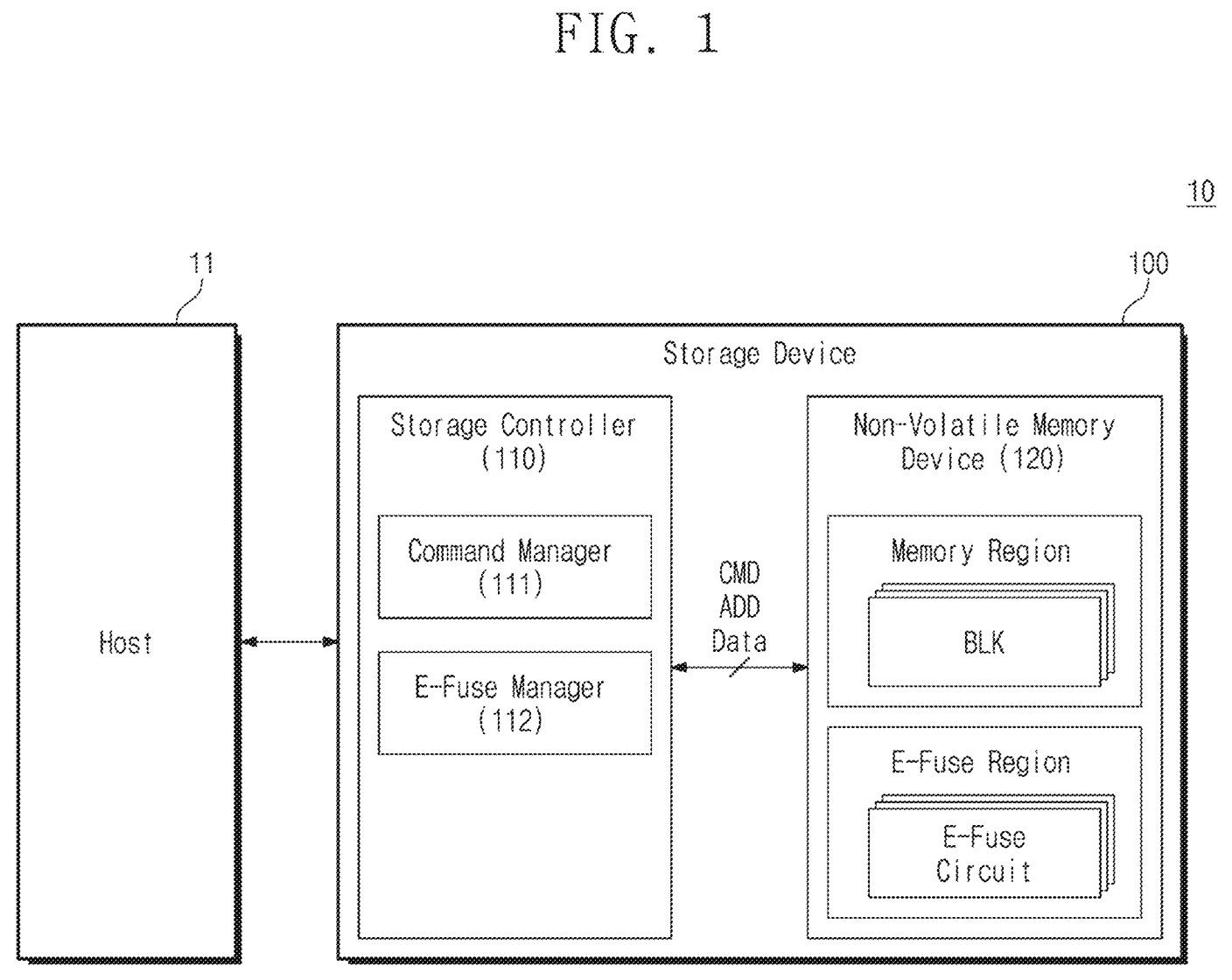

FIG. 1 is a block diagram of a storage system according to an example embodiment of the present disclosure. Referring to FIG. 1, a storage system 10 may include a host 11 and a storage device 100. In some example embodiments, the storage system 10 may refer to a computing system, which is configured to process a variety of information, such as a personal computer (PC), a notebook, a laptop, a server, a workstation, a tablet PC, a smartphone, a digital camera, and a black box.

The host 11 may control an overall operation of the storage system 10. For example, the host 11 may store data in the storage device 100 or may read data stored in the storage device 100.

The storage device 100 may include a storage controller 110 and a non-volatile memory device 120. The non-volatile memory device 120 may store data. The storage controller 110 may store data in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

The non-volatile memory device 120 may include a memory region and an E-fuse region.

The memory region may include a plurality of memory blocks. Each of the plurality of memory blocks may include a plurality of memory cells. The plurality of memory cells may store data.

The E-fuse region may include a plurality of E-fuse circuits. Each of the E-fuse circuits may store a value which the non-volatile memory device 120 refers to depending on an operation to be performed. For example, each of the plurality of E-fuse circuits may store information about a read level value corresponding to the read operation, in detail, read level values for respective memory cell types (e.g., read level values of a single level cell (SLC), a multi-level cell (MLC), and a triple level cell (TLC)), a program/erase (P/E) cycle, the number of times of an access to a memory device, etc. Information which each of the plurality of E-fuse circuits stores may be referred to as "setting information of the E-fuse region".

In some example embodiments, the non-volatile memory device 120 may be a NAND flash memory device, but the present disclosure is not limited thereto. For example, the non-volatile memory device 120 may be one of various storage devices, which retain data stored therein even when a power is turned off, such as a phase-change random access memory (PRAM), a magnetic random access memory (MRAM), a resistive random access memory (RRAM), and a ferroelectric random access memory (FRAM).

The non-volatile memory device 120 may fail to perform the memory operation based on the command CMD due to various factors. For example, a soft error may occur due to a noise, an electromagnetic field, a neutron, etc. The soft error may indicate a recoverable error. However, it may be difficult to identify the cause of the soft error which occurs when the E-fuse region is damaged or changed due to naturally occurring neutrons. This may mean that it is difficult to recover the soft error. This will be described in detail with reference to FIG. 4.

The storage controller 110 may include a command manager 111 and an E-fuse manager 112.

The command manager 111 may manage various commands indicating memory operations which the non-volatile memory device 120 performs. For example, the memory operation may include one of the read operation, the write operation, and the erase operation on user data. The command manager 111 may provide the non-volatile memory device 120 with various commands such as a read command, a write command, and an erase command.

In particular, the command manager 111 may manage an initialization command. The initialization command may indicate the read operation of initial setting information stored in the non-volatile memory device 120. The non-volatile memory device 120 may be initialized by the read operation of the initial setting information. The initial setting information may include information about a core timing and a DC regulator of the non-volatile memory device 120. The initial setting information may be obtained by a wafer test which is performed before a sawing process after the non-volatile memory device 120 is integrated in a wafer.

Also, the command manager 111 may manage a command for the E-fuse region. For example, the command manager 111 may manage a command indicating an initialization operation of the E-fuse region depending on the request of the E-fuse manager 112.

The initialization operation of the E-fuse region may indicate an operation of updating the setting information stored in the E-fuse region. For example, first setting information of the E-fuse region may be updated by the initialization operation of the E-fuse region so as to be changed to second setting information.

In some example embodiments, based on the second setting information stored in the non-volatile memory device 120, the non-volatile memory device 120 may update the first setting information of the E-fuse region so as to be changed to the second setting information. This will be described in detail with reference to FIG. 8.

In some example embodiments, based on the second setting information received from the storage controller 110, the non-volatile memory device 120 may update the first setting information of the E-fuse region so as to be changed to the second setting information. This will be described in detail with reference to FIG. 10.

To initialize the E-fuse region, the E-fuse manager 112 may communicate with the command manager 111, based on failure of a memory operation occurring in the non-volatile memory device 120. For example, in response to the failure of the memory operation, the E-fuse manager 112 may request the command manager 111 to generate the command indicating the initialization operation of the E-fuse region.

To again perform the failed memory operation (ex, target operation), the E-fuse manager 112 may communicate with the command manager 111 based on the E-fuse region being updated. For example, in response to the E-fuse region being updated, the E-fuse manager 112 may request the command manager 111 to generate the command indicating the failed memory operation.

As described above, according to example embodiments of the present disclosure, the storage device 100 may recover the soft error by initializing the E-fuse region when the memory operation fails.

FIG. 2 is a block diagram illustrating the storage controller 110 of FIG. 1 in detail, according to some example embodiments of the present disclosure. Referring to FIGS. 1 and 2, the storage controller 110 may communicate with the host 11 and the non-volatile memory device 120. The storage controller 110 may include the command manager 111, the E-fuse manager 112, a volatile memory device 113, a processor 114, a read only memory (ROM) 115, an error correcting code (ECC) engine 116, a host interface circuit 117, and a non-volatile memory interface circuit 118.

The command manager 111 may manage various commands indicating operations to be performed in the non-volatile memory device 120. For example, in response to the failure of the memory operation, the E-fuse manager 112 may request the command manager 111 to generate a command indicating the initialization operation of the E-fuse region and a memory operation identical to the failed memory operation.

In some example embodiments, the command manager 111 and the E-fuse manager 112 may be implemented in the form of a firmware module. For example, the processor 114 may implement the command manager 111 and the E-fuse manager 112 by loading instructions stored in the non-volatile memory device 120 to the volatile memory device 113 and executing the loaded instructions. However, the present disclosure is not limited thereto. For example, the command manager 111 and the E-fuse manager 112 may be implemented with separate hardware or may be implemented with a combination of hardware and software.

The volatile memory device 113 may be used as a main memory, a buffer memory, or a cache memory of the storage controller 110. The processor 114 may control an overall operation of the storage controller 110. The ROM 115 may be used as a read only memory which stores information necessary for the operation of the storage controller 110.

The ECC engine 116 may detect and correct an error of data obtained from the non-volatile memory device 120. For example, the ECC engine 116 may have an error correction capability of a given level. The ECC engine 116 may manage data having an error level (e.g., the number of flipped bits) exceeding the error correction capability as an uncorrectable error.

The storage controller 110 may communicate with the host 11 through the host interface circuit 117. In some example embodiments, the host interface circuit 117 may be implemented based on at least one of various interfaces such as a serial ATA (SATA) interface, a peripheral component interconnect express (PCIe) interface, a serial attached SCSI (SAS), a non-volatile memory express (NVMe) interface, and a universal flash storage (UFS) interface.

The storage controller 110 may communicate with the non-volatile memory device 120 through the non-volatile memory interface circuit 118. In some example embodiments, the non-volatile memory interface circuit 118 may be implemented based on the NAND interface.

Figure 3:
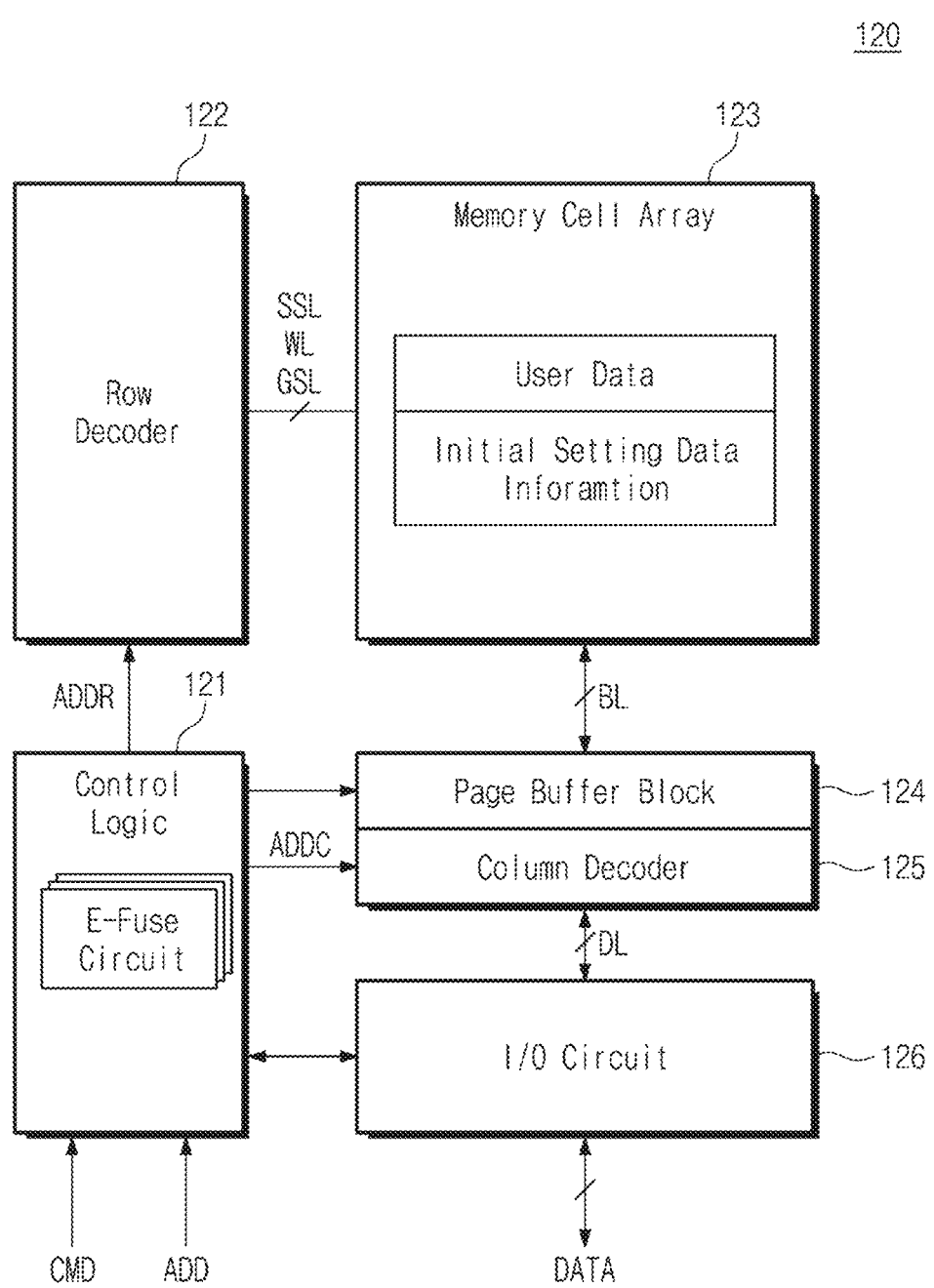
FIG. 3 is a block diagram illustrating a non-volatile memory device of FIG. 1 in detail, according to some example embodiments of the present disclosure.

FIG. 3 is a block diagram illustrating the non-volatile memory device 120 of FIG. 1 in detail, according to some example embodiments of the present disclosure. Referring to FIGS. 1 and 3, the non-volatile memory device 120 may communicate with the storage controller 110. For example, the non-volatile memory device 120 may receive the address ADD and the command CMD from the storage controller 110. The non-volatile memory device 120 may exchange data "DATA" with the storage controller 110.

The non-volatile memory device 120 may include control logic 121, a row decoder 122, a memory cell array 123, a page buffer block 124, a column decoder 125, and an input/output (I/O) circuit 126.

The control logic 121 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC.

The control logic 121 may include a plurality of E-fuse circuits. The plurality of E-fuse circuits may store setting information. The control logic 121 may control an overall operation of the non-volatile memory device 120 based on the setting information stored on the plurality of E-fuse circuits, the command CMD, and the address ADD. The control logic 121 may generate the row address ADDR and the column address ADDC based on the address ADD.

The row decoder 122 may receive the row address ADDR from the control logic 121. The row decoder 122 may be connected to the memory cell array 123 through string selection lines SSL, wordlines WL, and ground selection lines GSL. The row decoder 122 may decode the row address ADDR and may control voltages to be applied to the string selection lines SSL, the wordlines WL, and the ground selection lines GSL based on a result of the decoding.

The memory cell array 123 may store various data. For example, the memory cell array 123 may store user data and initial setting information. The user data may indicate data written in the memory cell array 123 depending on a request of a host. The non-volatile memory device 120 may be initialized by performing the read operation on the initial setting information.

The page buffer block 124 may include a plurality of page buffers. The page buffer block 124 may be connected to the memory cell array 123 through bitlines BL. The page buffer block 124 may read data from the memory cell array 123 by sensing voltages of the bitlines BL.

The column decoder 125 may receive the column address ADDC from the control logic 121. The column decoder 125 may decode the column address ADDC and may provide the data read by the page buffer block 124 to the I/O circuit 126 based on a result of the decoding. The page buffer block 124 may store the data provided from the I/O circuit 126 in the memory cell array 123 through the bitlines BL.

The I/O circuit 126 may be connected to the column decoder 125 through data lines DL. The I/O circuit 126 may transfer data received from the storage controller 110 to the column decoder 125 through the data lines DL. The I/O circuit 126 may provide data received through data lines DL to the storage controller 110.

Figure 4:
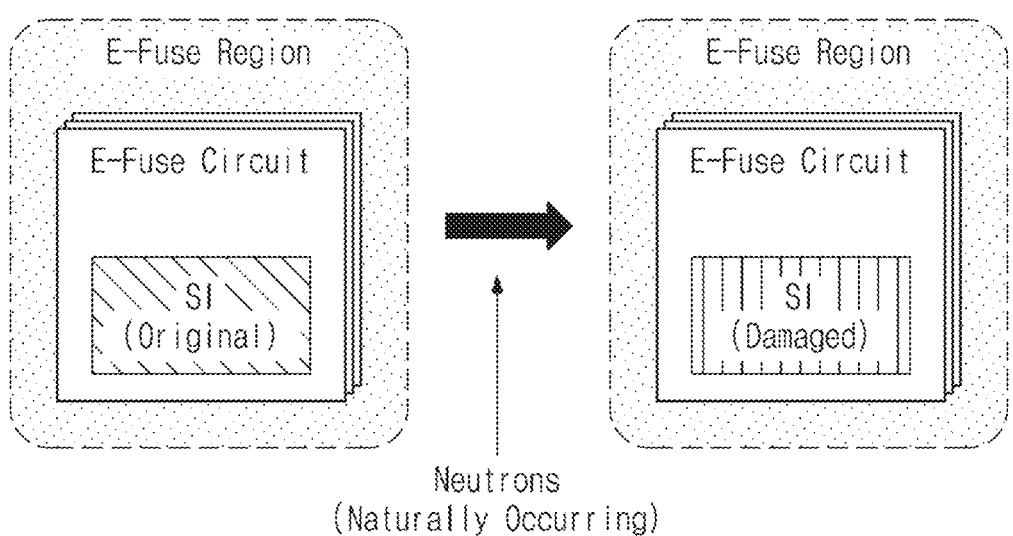
FIG. 4 is a diagram describing an E-fuse region according to some example embodiments of the present disclosure.

FIG. 4 is a diagram describing an E-fuse region according to some example embodiments of the present disclosure. How the E-fuse region changes due to neutrons will be described with reference to FIG. 4. The E-fuse region of FIG. 4 corresponds the E-fuse region of FIG. 1.

The E-fuse region may include a plurality of E-fuse circuits. The E-fuse region may store setting information SI determined by the plurality of E-fuse circuits. The setting information SI may include a read level value, a write level value, etc. which each of the plurality of E-fuse circuits refers to. Accordingly, when the setting information SI changes, a result of the memory operation which is performed in the memory region may change.

The setting information SI may be changed based on a command but may also be changed due to unintended external factors. In this case, when a non-volatile memory device performs the memory operation based on unintended setting information, the failure of the memory operation (i.e., a soft error) may occur.

In some example embodiments, the E-fuse region may be damaged or changed due to neutrons. For example, the setting information may be changed (or damaged) due to neutrons naturally occurring outside a storage device.

In detail, setting information of the E-fuse region, which is changed due to the exposure to the neutrons, may be referred to as "first setting information". In an example embodiment, setting information of the E-fuse region, which does not experience the change, may be referred to as "second setting information".

Because a general storage device is incapable of identifying the soft error caused by the damage or change of the E-fuse region, it may be difficult to recover the soft error. In contrast, as described above, the storage device according to the present disclosure may make the recovery rate of the soft error higher by initializing the E-fuse region when the soft error occurs.

Figure 5:
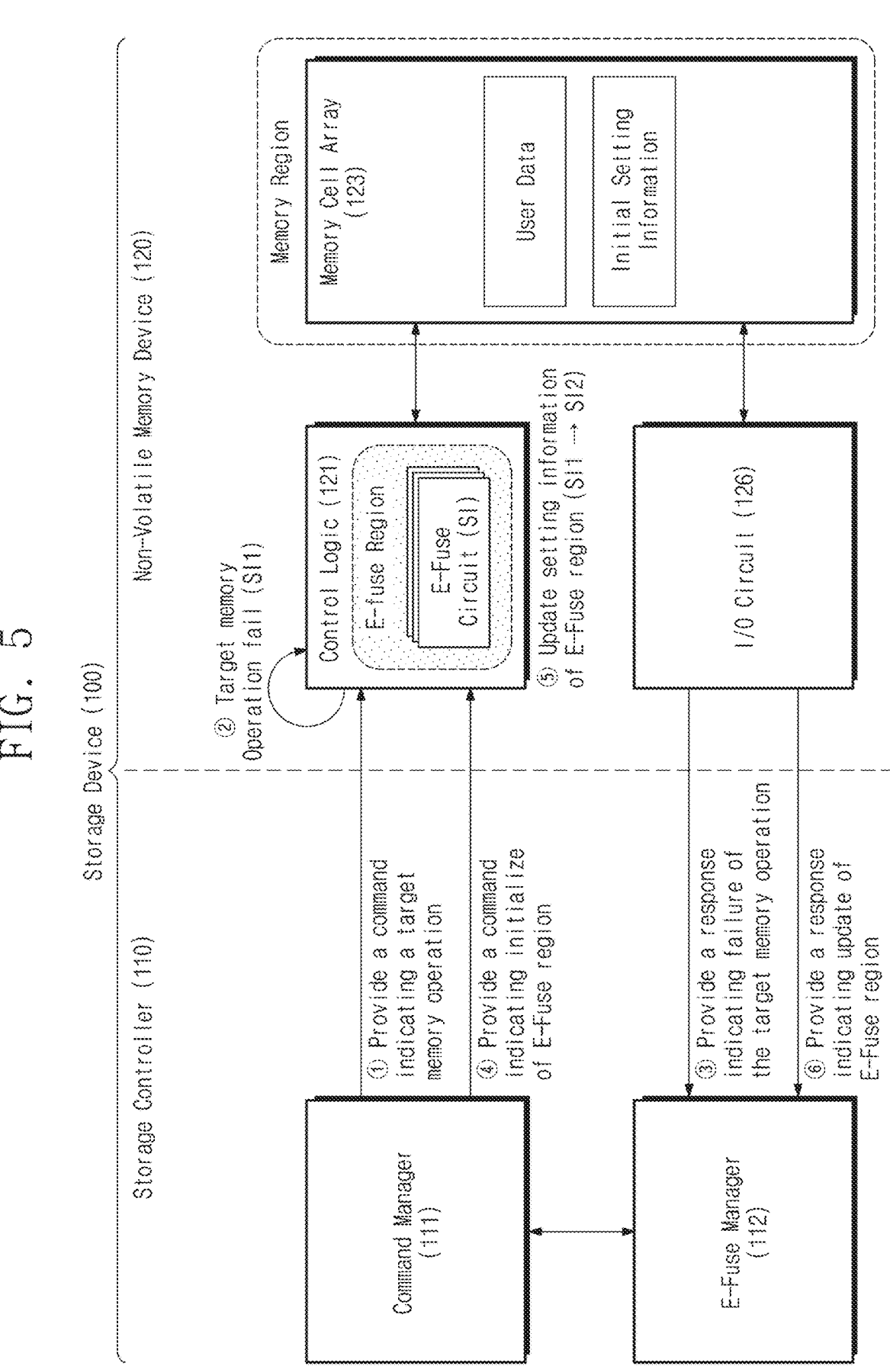
FIG. 5 is a flowchart describing an operating method of a storage device according to some example embodiments of the present disclosure.

FIG. 5 is a flowchart describing an operating method of a storage device according to some example embodiments of the present disclosure. Referring to FIG. 5, the storage device 100 may include the storage controller 110 and the non-volatile memory device 120. The storage controller 110 may include the command manager 111 and the E-fuse manager 112. The non-volatile memory device 120 may include the control logic 121, the memory cell array 123, and the I/O circuit 126.

The command manager 111 may generate a first command indicating a target memory operation of user data. For example, the target memory operation may include one of various memory operations such as the read operation, the write operation, and the erase operation. The command manager 111 may generate a second command indicating the initialization operation of the E-fuse region depending on the request of the E-fuse manager 112.

In some example embodiments, the second command may be the initialization command. The initialization command may indicate the read operation of initial setting information stored in a memory region of a non-volatile memory device. The initialization operation of the E-fuse region associated with the initialization command will be described in detail with reference to FIG. 8.

In some example embodiments, the second command may include backup data. The backup data may indicate setting information stored in an internal memory device of a storage controller before the first command is generated. The initialization operation of the E-fuse region associated with the backup data will be described in detail with reference to FIG. 10.

The E-fuse manager 112 may receive a first response indicating the failure of the target memory operation from the non-volatile memory device 120. Based on the failure of the target memory operation, the E-fuse manager 112 may request the command manager 111 to generate the second command indicating the initialization operation of the E-fuse region.

The E-fuse manager 112 may receive a second response, which indicates that the E-fuse region is updated, from the I/O circuit 126. Based on the E-fuse region being updated, the E-fuse manager 112 may request the command manager 111 to generate a third command indicating the target memory operation.

The control logic 121 may communicate with the command manager 111 and the memory cell array 123. The control logic 121 may perform the target memory operation based on the first command received from the command manager 111. For example, the control logic 121 may perform the target memory operation based on the first command and the first setting information stored in the E-fuse region. For example, the control logic 121 may perform the target memory operation on the memory cell array 123 based on the read level, the write level, etc. determined based on the first setting information.

As another example, the control logic 121 may perform the initialization operation of the E-fuse region based on the second command indicating the initialization operation of the E-fuse region. For example, the control logic 121 may update first setting information SI1 of the E-fuse region based on the second command, so as to be changed to second setting information SI2. How the setting information of the E-fuse region is updated will be described in detail with reference to FIG. 8 and will also be described in detail with reference to FIG. 10.

The memory cell array 123 may store user data and initial setting information. For example, as the read operation is performed, the user data of the memory cell array 123 may be read, and the read user data may be output through the I/O circuit 126. For example, as the write operation is performed, the user data may be stored in the memory cell array 123.

As the read operation on the initial setting information is performed, the memory cell array 123 may read the initial setting information. The non-volatile memory device 120 may be set to an initial state based on the initial setting information thus read. That is, the non-volatile memory device 120 may be initialized.

The I/O circuit 126 may communicate with the memory cell array 123 and the storage controller 110.

Below, an operating method of the storage device 100 according to some example embodiments of the present disclosure will be described in detail.

In a first operation ①, the command manager 111 may provide the non-volatile memory device 120 with the first command indicating the target memory operation. The control logic 121 may perform the target memory operation based on the first command and the first setting information SI1 stored in the E-fuse region.

In a second operation ②, the control logic 121 may fail in the target memory operation. In other words, even though the control logic 121 attempts to perform the target memory operation, the failure of the target memory operation may occur.

In some example embodiments, the failure of the target memory operation may be caused by a soft error coming from the neutrons. For example, when the E-fuse region is damaged or changed by the neutrons, the failure of the memory operation may occur.

In a third operation ③, under control of the control logic 121, the I/O circuit 126 may provide the storage controller 110 with the first response indicating the failure of the target memory operation.

In a fourth operation ④, the command manager 111 may provide the non-volatile memory device 120 with the second command indicating the initialization operation of the E-fuse region. For example, the command manager 111 may generate the second command depending on the request of the E-fuse manager 112.

In a fifth operation ⑤, the control logic 121 may update the first setting information SI1 of the E-fuse region based on the second command, so as to be changed to the second setting information SI2.

In a sixth operation ⑥, under control of the control logic 121, the I/O circuit 126 may provide the storage controller 110 with the second response indicating that the E-fuse region is updated.

In some example embodiments, although not illustrated in FIG. 5, after the sixth operation ⑥, the storage device 100 may again perform the target memory operation based on the updated setting information of the E-fuse region. This will be described in detail with reference to FIG. 7.

Figure 6:
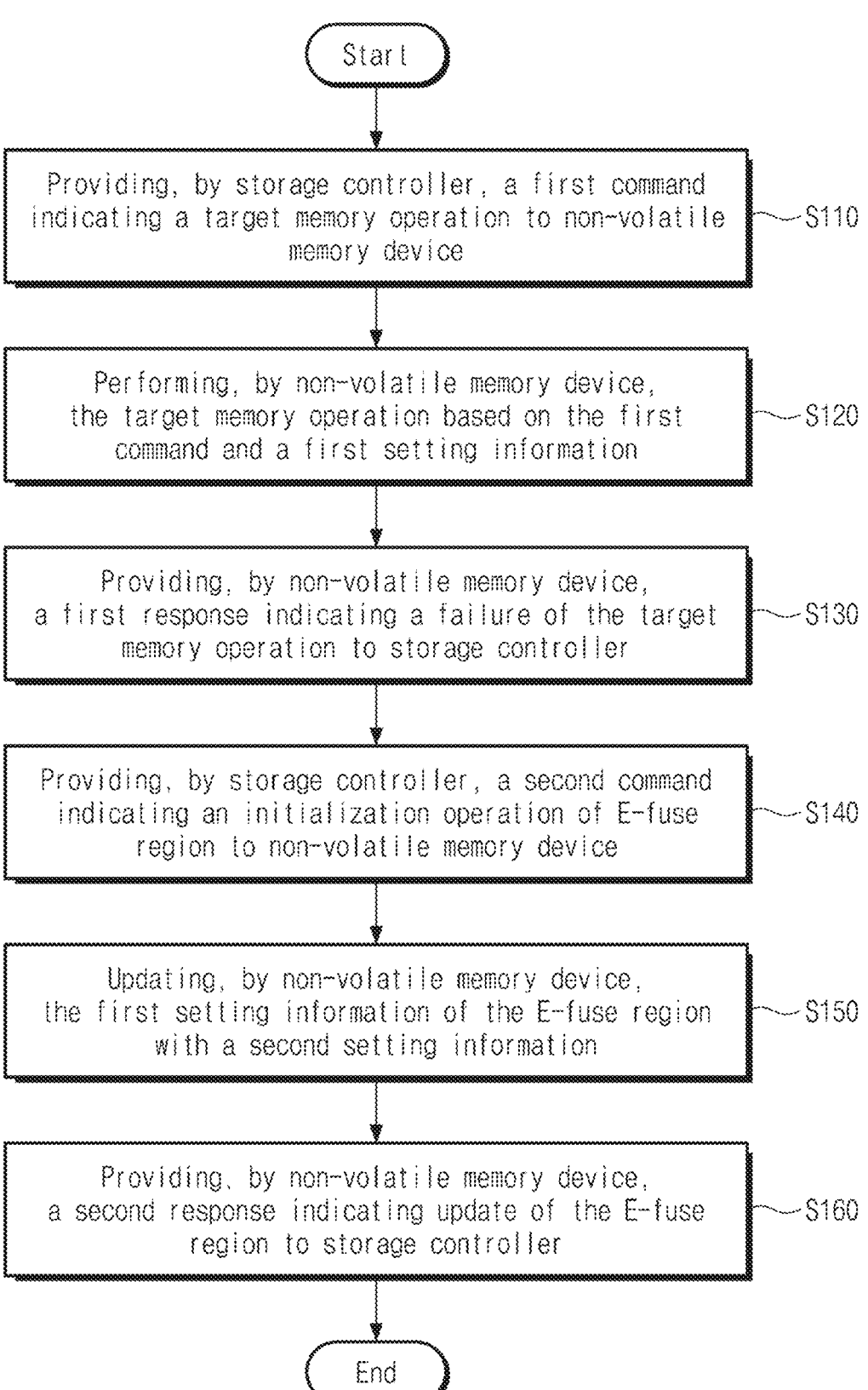
FIG. 6 is a flowchart describing an operating method of a storage device according to some example embodiments of the present disclosure.

FIG. 6 is a flowchart describing an operating method of a storage device according to some example embodiments of the present disclosure. An operating method of a storage device according to some example embodiments of the present disclosure will be described with reference to FIG. 6. The storage device may include a storage controller and a non-volatile memory device. The storage device may correspond to the storage device 100 of FIG. 5.

In operation S110, the storage controller may provide the non-volatile memory device with a first command indicating a target memory operation of user data. For example, the target memory operation may include one of various memory operations such as the read operation, the write operation, and the erase operation.

In operation S120, the non-volatile memory device may perform the target memory operation based on the first command and first setting information of the E-fuse region.

In operation S130, the non-volatile memory device may provide the storage controller with a first response indicating that the memory operation indicated by the first command fails.

In operation S140, the storage controller may provide the non-volatile memory device with a second command indicating the initialization operation of the E-fuse region based on the first response.

In some example embodiments, the second command may be the initialization command.

In some example embodiments, the second command may include backup data.

In operation S150, the non-volatile memory device may update the first setting information of the E-fuse region based on the second command, so as to be changed to second setting information.

In some example embodiments, operation S150 may include performing, by the non-volatile memory device, the read operation on initial setting information stored in the memory region based on the second command; loading, by the non-volatile memory device, the second setting information about the E-fuse region, which is included in the initial setting information to the E-fuse region; and updating, by the non-volatile memory device, the first setting information of the E-fuse region based on the loaded second setting information, so as to be changed to the second setting information.

In some example embodiments, operation S150 may include updating the first setting information of the E-fuse region so as to be changed to the second setting information of the backup data. The second backup data is included in the second command.

In operation S160, the non-volatile memory device may provide the storage controller with a second response indicating that the E-fuse region is updated.

In some example embodiments, operation S160 may further include providing, by the storage controller, the non-volatile memory device with a third command indicating the target memory operation; and again performing, by the non-volatile memory device, the target memory operation based on the third command.

Figure 7:
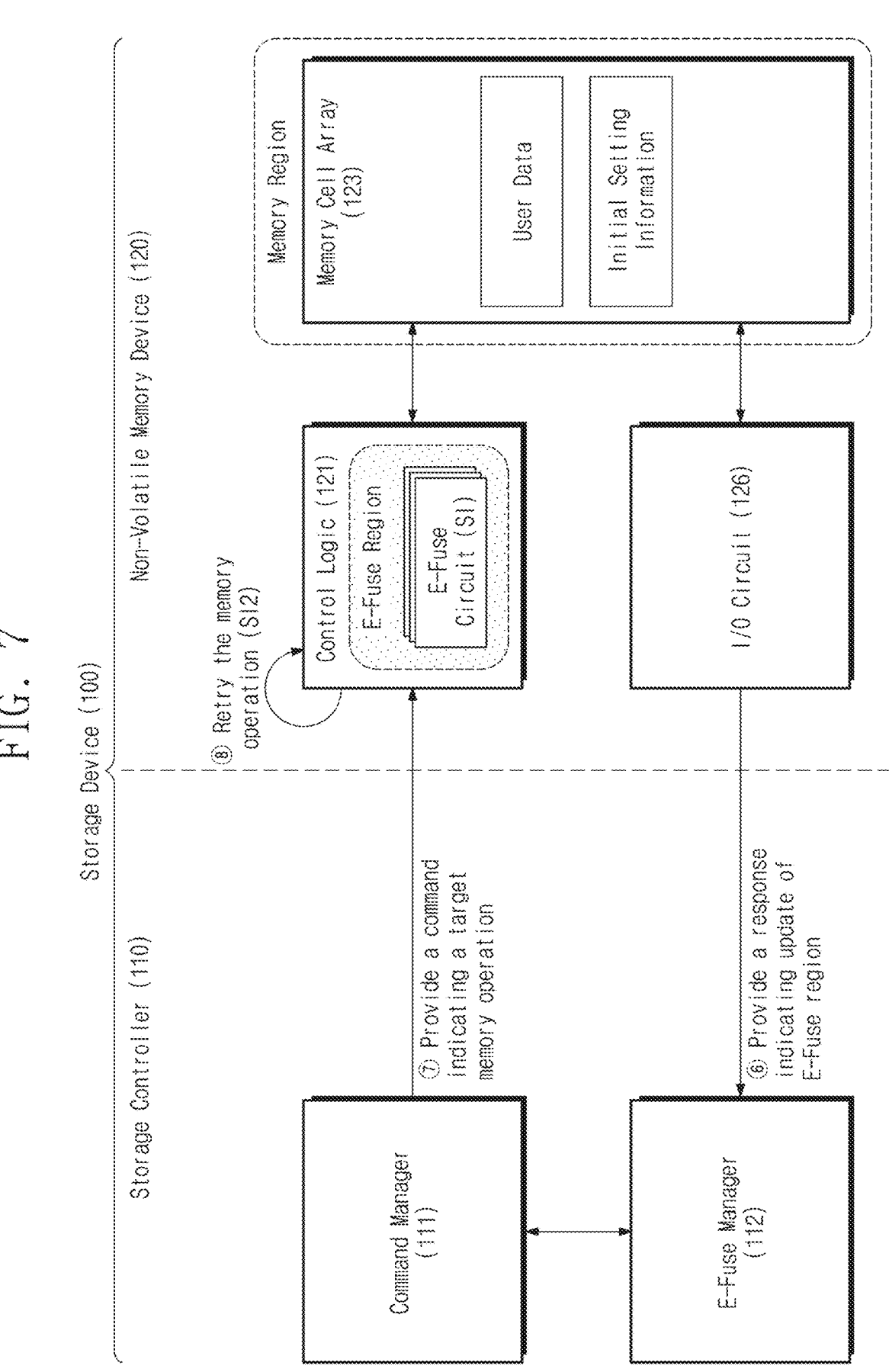
FIG. 7 is a diagram describing a method in which a storage device again performs a memory operation, according to some example embodiments of the present disclosure.

FIG. 7 is a diagram describing a method in which a storage device again performs a memory operation, according to some example embodiments of the present disclosure. A method in which a storage device again performs a memory operation after the sixth operation ⑥ of FIG. 5 will be described with reference to FIG. 7. The storage controller 110 and the non-volatile memory device 120 of FIG. 7 may respectively correspond to the storage controller 110 and the non-volatile memory device 120 of FIG. 5.

For convenience of description, in FIG. 7, the description which is given with reference to FIG. 5 will be omitted to avoid redundancy.

The storage device 100 may be configured to again perform the failed memory operation based on the E-fuse region being updated.

In detail, the E-fuse manager 112 may receive a response, which indicates that the E-fuse region is updated, from the I/O circuit 126. Based on the received response, the E-fuse manager 112 may request the command manager 111 to generate the third command indicating the target memory operation. The command manager 111 may generate the third command depending on the request of the E-fuse manager 112.

Below, an operating method of the storage device 100 according to some example embodiments of the present disclosure will be described in detail.

In a sixth operation ⑥, the I/O circuit 126 may provide the storage controller 110 with the response indicating that the E-fuse region is updated.

In a seventh operation ⑦, the command manager 111 may provide the non-volatile memory device 120 with the command indicating the target memory operation.

In an eighth operation ⑧, the control logic 121 may again perform the target memory operation based on the third command and the updated setting information of the E-fuse region.

The non-volatile memory device 120 may provide the storage controller 110 with the third response indicating that the target memory operation succeeds or with the output data of the target memory operation.

Because a general storage device does not intend to use a memory block in which the target memory operation fails any longer, the general storage device may fail to recover the soft error. This may mean that an available memory region decreases. However, as described above, when the E-fuse region is initialized, the storage device according to the present disclosure may again perform the failed target memory operation, and thus, the available memory region of the storage device may be maintained.

FIG. 8 is a diagram describing a method in which a storage device initializes an E-fuse region, according to some example embodiments of the present disclosure. A method in which a storage device according to some example embodiments of the present disclosure initializes the E-fuse region by initializing a non-volatile memory device will be described with reference to FIG. 8. The storage device 100 of FIG. 8 corresponds to the storage device 100 of FIGS. 1 and 5.

That is, FIG. 8 describes an E-fuse region initializing method associated with the fifth operation ⑤ of FIG. 5 in detail. In this case, with regard to the fourth operation ④ of FIG. 5, the second command may be the initialization command indicating the initialization operation of the non-volatile memory device.

For convenience, descriptions the same as the descriptions given with reference to FIG. 5 from among the descriptions given with reference to the command manager 111, the E-fuse manager 112, the control logic 121, the memory cell array 123, and the I/O circuit 126 will be omitted to avoid redundancy.

In a first operation ①, the control logic 121 may perform the read operation of the initial setting information stored in the memory region based on the initialization command being the second command.

In some example embodiments, the control logic 121 may perform the read operation of the initial setting information only in a region where the target memory operation fails.

For example, the control logic 121 may perform the read operation of the initial setting information only in a chip where the target memory operation fails. The non-volatile memory device 120 may include a plurality of memory chips. Each of the plurality of memory chips may include at least one or more memory cell arrays.

In detail, in the third operation ③ of FIG. 5, the first response may include location information about the region where the target memory operation fails. In the fourth operation ④ of FIG. 5, the second command may indicate the read operation of the initial setting information, which is limited to the region where the target memory operation fails.

In the second operation ②, the control logic 121 may load the second setting information SI2 associated with the E-fuse region from among the initial setting information to the E-fuse region.

As described above, the initial setting information is described as including the second setting information SI2, but the present disclosure is not limited thereto. For example, the second setting information SI2 may be stored in the control logic 121 or in any other memory device and may be loaded to the E-fuse region based on the read operation of the initial setting information.

In a third operation ③, the control logic 121 may update the first setting information SI1 previously stored in the E-fuse region, so as to be changed to the second setting information SI2. For example, a read level value, a write level value, etc. of each of the plurality of E-fuse circuits may be set based on the second setting information SI2. As a specific example, the first read level value of the first setting information S1 stored by the E-fuse circuit among the plurality of E-fuse circuits may be changed to a second read level value of the second setting information S2. The storage controller 110 may then reference the second read level value when reading data stored in the memory cell corresponding to the updated E-fuse circuit.

In some example embodiments, the initialization operation of the setting information may be the same as the initialization operation immediately after the storage device 100 is powered on.

In some example embodiments, operation ③ may be performed based on a read command, an erase command, and a write command from the storage controller, or may be implemented by the circuitry design of the E-fuse region.

In a fourth operation ④, under control of the control logic 121, the I/O circuit 126 may provide the E-fuse manager 112 with the second response indicating that the E-fuse region is updated.

In a fifth operation ⑤, based on the E-fuse region being updated, the E-fuse manager 112 may again set an input/output mode between the storage controller 110 and the non-volatile memory device 120.

For example, the input/output mode may indicate an electrical characteristic which the storage controller 110 and the non-volatile memory device 120 share with regard to an input/output of signals between the storage controller 110 and the non-volatile memory device 120.

As another example, the input/output mode may be set to correspond to a mode in which the non-volatile memory device 120 operates from among an SLC mode, an MLC mode, and a TLC mode.

In a sixth operation ⑥, the E-fuse manager 112 may reset context information about the non-volatile memory device 120. In detail, based on the second response, the E-fuse manager 112 may update context information about the non-volatile memory device 120, which is stored in the storage controller 110.

The context information may include status information about the non-volatile memory device 120, which is necessary for the storage controller 110 for the storage device 100 to perform the memory operation. For example, the status information may include the initial setting information of the non-volatile memory device 120.

In other words, in a state where the non-volatile memory device 120 is only initialized, afterwards, for the storage controller 110 and the non-volatile memory device 120 to normally communicate with each other and to again perform the memory operation successfully, the E-fuse manager 112 may reset the input/output mode and the context information.

The description is given as the E-fuse manager 112 resets the input/output mode and the context information of the non-volatile memory device 120, but the present disclosure is not limited thereto. For example, depending on the request of the E-fuse manager 112, the command manager 111 or any other component of the storage controller 110 may reset the input/output mode and the context information of the non-volatile memory device 120.

In some example embodiments, it may also be desirable to change of the storage controller 110 in conjunction with initializing the non-volatile memory device 120. As described above, the storage device 100 according to the present disclosure may again perform the memory operation normally by initializing the non-volatile memory device 120 and resetting the input/output mode and the context information based on the non-volatile memory device 120 thus initialized.

According to some example embodiments, although not illustrated in FIG. 8, after the sixth operation ⑥, the E-fuse manager 112 may request the command manager 111 to generate the third command indicating the target memory operation. The command manager 111 may generate the third command depending on the request of the E-fuse manager 112 and may provide the third command to the non-volatile memory device 120. The control logic 121 may perform the memory operation based on the third command and the second setting information SI2 of the E-fuse region. That is, the control logic 121 may again perform the target memory operation based on the third command.

FIG. 9 is a flowchart describing a method in which a storage device initializes an E-fuse region, according to some example embodiments of the present disclosure. According to some example embodiments of the present disclosure, an operating method of a storage device which initializes an E-fuse region by initializing a non-volatile memory device when a soft error occurs will be described with reference to FIG. 9. The storage controller 110 and the non-volatile memory device 120 of FIG. 9 respectively correspond to the storage controller 110 and the non-volatile memory device 120 of FIG. 8.

In operation S210, the storage controller 110 may provide the non-volatile memory device 120 with a first command indicating a target memory operation of user data.

In operation S220, the non-volatile memory device 120 may perform the target memory operation based on the first command and first setting information stored in the E-fuse region and may experience the failure of the target memory operation.

In some example embodiments, the failure of the memory operation may be caused by a soft error coming from the neutrons. For example, when the E-fuse region is damaged or changed by the neutrons, the failure of the memory operation may occur.

In operation S230, the non-volatile memory device 120 may provide the storage controller 110 with a first response indicating the failure of the target memory operation.

In operation S240, the storage controller 110 may generate a second command indicating the initialization of the E-fuse region. For example, the second command may be the initialization command indicating the initialization operation of the non-volatile memory device 120. That is, the second command may indicate the read operation of initial setting information stored in a memory region.

In operation S250, the storage controller 110 may provide the second command to the non-volatile memory device 120.

In operation S260, the non-volatile memory device 120 may perform the read operation of the initial setting information stored in the memory region based on the second command.

In operation S270, the non-volatile memory device 120 may load second setting information associated with the E-fuse region from among the initial setting information to the E-fuse region.

In operation S280, the non-volatile memory device 120 may update the setting information of the E-fuse region based on the second setting information. For example, through the update, the first setting information of the E-fuse region may be changed to the second setting information.

In some example embodiments, although not illustrated in FIG. 9, operation S280 may further include providing, by the non-volatile memory device 120, the storage controller 110 with a second response indicating that the E-fuse region is updated; providing, by the storage controller 110, the non-volatile memory device 120 with a third command indicating the target memory operation based on the second response; and, again performing, by the non-volatile memory device 120, the target memory operation based on the third command and the second setting information of the E-fuse region.

Figure 10:
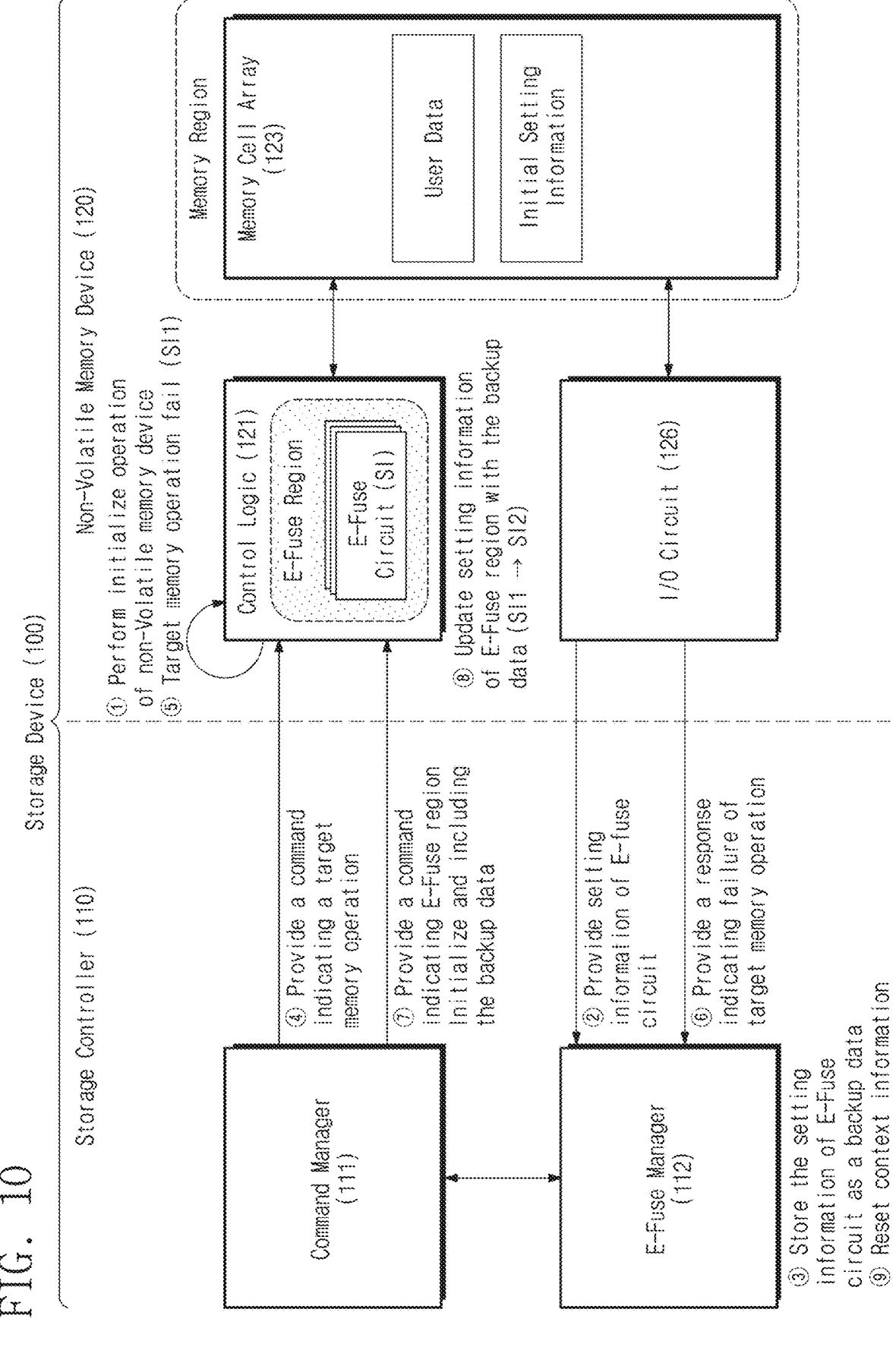
FIG. 10 is a diagram describing a method in which a storage device initializes an E-fuse region, according to some example embodiments of the present disclosure.

FIG. 10 is a diagram describing a method in which a storage device initializes an E-fuse region, according to some example embodiments of the present disclosure. According to some example embodiments of the present disclosure, an operating method of a storage device which initializes an E-fuse region based on setting information backed up to the storage controller 110 when a soft error occurs will be described with reference to FIG. 10. The storage device 100 of FIG. 10 correspond to the storage device 100 of FIG. 5. That is, FIG. 10 describes the operations of FIG. 5 in detail.

The storage device 100 may include the storage controller 110 and the non-volatile memory device 120. The storage controller 110 may include the command manager 111 and the E-fuse manager 112. The non-volatile memory device 120 may include the control logic 121, the memory cell array 123, and the I/O circuit 126.

For convenience, descriptions the same as the descriptions given with reference to FIG. 5 from among the descriptions given with reference to the command manager 111, the E-fuse manager 112, the control logic 121, the memory cell array 123, and the I/O circuit 126 will be omitted to avoid redundancy.

The command manager 111 may generate a command indicating the initialization operation of the non-volatile memory device 120. The control logic 121 may perform the initialization operation of the non-volatile memory device 120 based on the command received from the command manager 111.

In some example embodiments, the command manager 111 may provide the initialization command to the non-volatile memory device 120 based on the storage device 100 being powered on. For example, the initialization command may indicate the read operation of initial setting information stored in a memory region. The non-volatile memory device 120 may be reset based on the initial setting information.

In some example embodiments, in addition to the power-on of the storage device 100, based on a request of a host or the E-fuse manager 112, the command manager 111 may provide the non-volatile memory device 120 with the command indicating the initialization operation of the non-volatile memory device 120.

For example, when the soft error occurs, the command manager 111 may provide the non-volatile memory device 120 with the command indicating the initialization operation of the non-volatile memory device 120, based on the request of the E-fuse manager 112.

The command manager 111 may generate the command indicating the initialization of the E-fuse region depending on the request of the E-fuse manager 112. In this case, the command indicating the initialization of the E-fuse region may include backup data. The backup data will be described in detail later.

After the initialization operation of the non-volatile memory device 120 is completed, the E-fuse manager 112 may receive setting information stored in the E-fuse region from the I/O circuit 126.

In some example embodiments, the E-fuse manager 112 may store the setting information of the E-fuse region received from the non-volatile memory device 120 in an internal memory device of the storage controller 110 as backup data.

For example, the E-fuse manager 112 may include a separate memory device therein, and may store the setting information, which is received from the non-volatile memory device 120 and is present in the E-fuse region, in the memory device of the E-fuse manager 112 as backup data.

In some example embodiments, a result obtained by further performing a post-processing operation with respect to the setting information of the E-fuse region included in the initial setting information of the memory region may be the same as the setting information of the E-fuse region included in the backup data.

For example, the post-processing operation may refer to an operation of adjusting a read level value of the setting information in detail so as to be more appropriate for a memory operation to be performed in a non-volatile memory device.

The control logic 121 may change the setting information of the E-fuse region to the setting information of the backup data, based on the command indicating the initialization of the E-fuse region and including the backup data.

Below, an operating method of the storage device 100 according to some example embodiments of the present disclosure will be described in detail.

In a first operation ①, the control logic 121 may perform the initialization operation of the non-volatile memory device 120. Although not illustrated in FIG. 10, the control logic 121 may receive a command indicating the initialization operation of the non-volatile memory device 120 from the command manager 111.

In some example embodiments, the initialization operation of the non-volatile memory device 120 may indicate the read operation of initial setting information stored in the memory region of the non-volatile memory device 120.

In a second operation ②, under control of the control logic 121, the I/O circuit 126 may provide the storage controller 110 with the setting information of the E-fuse region. In this case, the setting information of the E-fuse region may be the setting information SI2 stored in the E-fuse region when the initialization operation of the non-volatile memory device 120 is completed.

In a third operation ③, the E-fuse manager 112 may store the setting information SI2 of the E-fuse region received from the non-volatile memory device 120 in an internal memory device of the storage controller 110 as backup data.

In a fourth operation ④, the command manager 111 may provide the non-volatile memory device 120 with a first command indicating a target memory operation of user data.

In a fifth operation ⑤, the control logic 121 may perform the target memory operation based on the first command and the first setting information SI1 stored in the E-fuse region and may experience the failure of the target memory operation.

In some example embodiments, the failure of the target memory operation may be caused by a soft error coming from the neutrons. For example, when the E-fuse region is damaged or changed by the neutrons, the failure of the target memory operation may occur.

In a sixth operation ⑥, under control of the control logic 121, the I/O circuit 126 may provide the storage controller 110 with a first response indicating the failure of the target memory operation.

In a seventh operation ⑦, the command manager 111 may provide the non-volatile memory device 120 with a second command indicating the initialization operation of the E-fuse region. The second command may include the backup data. The backup data may include the second setting information SI2. Although not illustrated in FIG. 10, the command manager 111 may receive the backup data from the E-fuse manager 112 and may receive a request to generate the second command.

In an eighth operation ⑧, the control logic 121 may update the first setting information SI1 of the E-fuse region based on the second command, so as to be changed to the second setting information SI2.

In some example embodiments, although not illustrated in FIG. 10, after the eighth operation ⑧, the I/O circuit 126 may provide the storage device 100 with a second response indicating that the E-fuse region is updated. The E-fuse manager 112 may reset context information based on the second response.

According to some example embodiments, although not illustrated in FIG. 10, the storage device 100 may initialize the E-fuse region and may then again perform the target memory operation.

For example, after the eighth operation ⑧, the I/O circuit 126 may provide the storage controller 110 with the second response indicating that the E-fuse region is updated. Based on the second response, the E-fuse manager 112 may request the command manager 111 to generate a third command indicating the target memory operation. The command manager 111 may generate the third command depending on the request of the E-fuse manager 112 and may provide the third command to the non-volatile memory device 120. The control logic 121 may perform the memory operation based on the third command and the second setting information SI2 of the E-fuse region. That is, the control logic 121 may again perform the target memory operation based on the third command.

Figure 11:
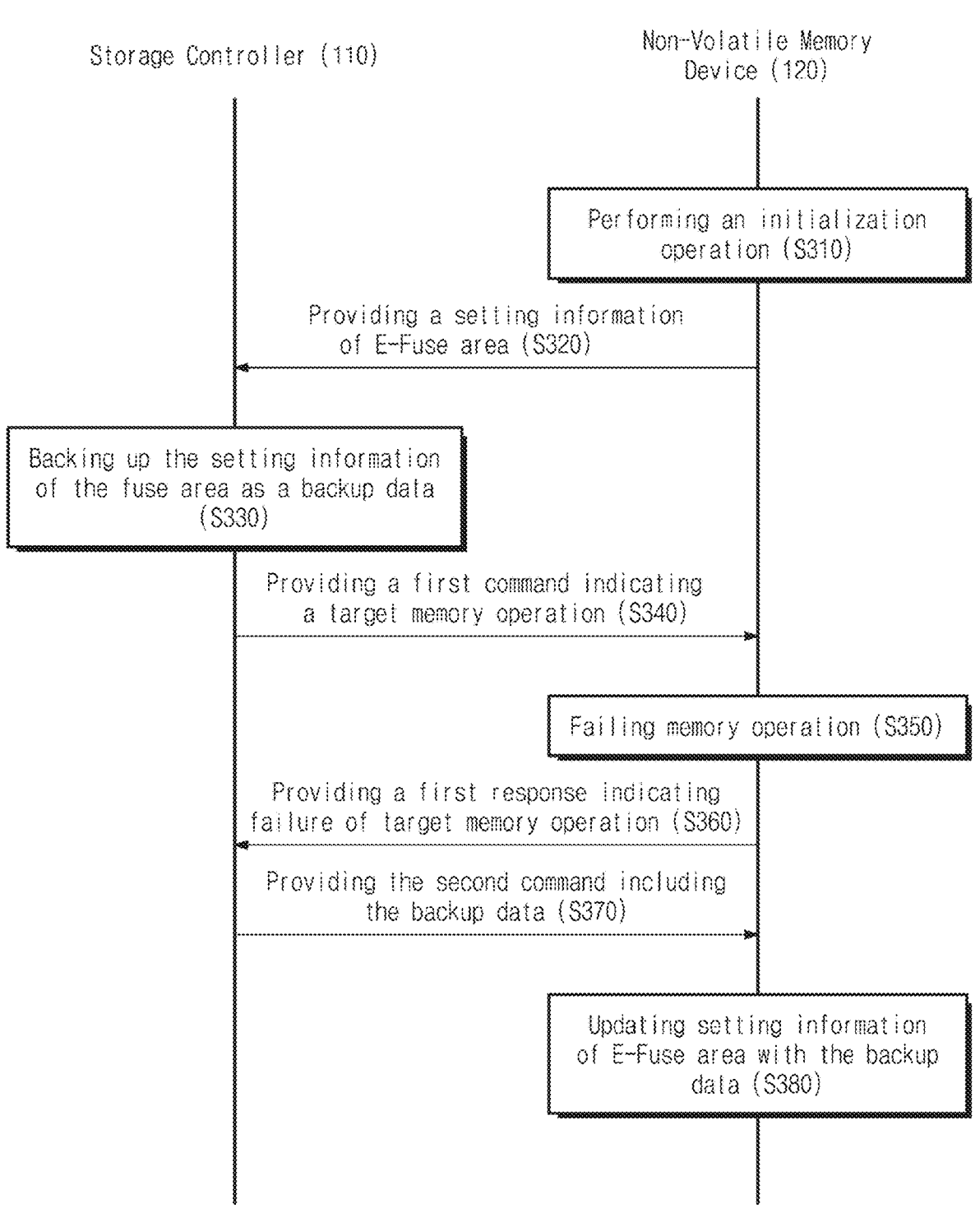
FIG. 11 is a flowchart describing a method in which a storage device initializes an E-fuse region, according to some example embodiments of the present disclosure.

FIG. 11 is a flowchart describing a method in which a storage device initializes an E-fuse region, according to some example embodiments of the present disclosure. According to some example embodiments of the present disclosure, an operating method of the storage device 100 which initializes an E-fuse region based on setting information backed up to the storage controller 110 when a soft error occurs will be described with reference to FIG. 11. The storage controller 110 and the non-volatile memory device 120 of FIG. 11 respectively correspond to the storage controller 110 and the non-volatile memory device 120 of FIG. 5.

In operation S310, the non-volatile memory device 120 may perform the initialization operation. In detail, the non-volatile memory device 120 may perform the initialization operation of the non-volatile memory device 120 based on the initialization command received from the storage controller 110.

In some example embodiments, the initialization operation may indicate the read operation of initial setting information stored in a memory region.

In operation S320, the non-volatile memory device 120 may provide setting information stored in the E-fuse region to the storage controller 110. In this case, the setting information present in the E-fuse region may indicate setting information after the initialization operation of the non-volatile memory device 120 is completed.

In operation S330, an internal memory device of the storage controller 110 may store the setting information of the E-fuse region received from the non-volatile memory device 120 as backup data.

In operation S340, the storage controller 110 may provide the non-volatile memory device 120 with a first command indicating a target memory operation of user data.

In operation S350, the non-volatile memory device 120 may perform the target memory operation based on the first command and first setting information stored in the E-fuse region and may experience the failure of the target memory operation. That is, the non-volatile memory device 120 may fail in the memory operation.

In some example embodiments, the failure of the memory operation may be caused by a soft error coming from the neutrons. For example, the failure of the memory operation may occur due to the change and damage of the E-fuse region caused by the neutrons.

In operation S360, the non-volatile memory device 120 may provide the storage controller 110 with a first response indicating the failure of the target memory operation.

In operation S370, the storage controller 110 may provide the non-volatile memory device 120 with a second command indicating the initialization operation of the E-fuse region based on the first response. Herein, the second command may include the backup data.

In operation S380, the non-volatile memory device 120 may update the first setting information of the E-fuse region based on the second command, so as to be changed to the setting information of the backup data.

In some example embodiments, although not illustrated in FIG. 11, operation S380 may further include providing, by the non-volatile memory device 120, the storage controller 110 with a second response indicating that the E-fuse region is updated; providing, by the storage controller 110, the non-volatile memory device 120 with a third command indicating the target memory operation based on the second response; and, again performing, by the non-volatile memory device 120, the target memory operation based on the third command and the second setting information of the E-fuse region.

According to an example embodiment of the present disclosure, a storage device initializing an E-fuse region and an operating method thereof are provided.

Also, when a soft error occurs, the recovery rate of the error which is difficult to identify the cause may be improved by initializing the E-fuse region, and an available memory region may be maintained by again performing a failed memory operation.

While the present disclosure has been described with reference to example embodiments thereof, it will be apparent to those of ordinary skill in the art that various changes and modifications may be made thereto without departing from the spirit and scope of the present disclosure as set forth in the following claims.

The storage controller 110 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Various generators (e.g., parity generator, check bit generator, and syndrome generator), various decoders (e.g., ECC decoder, row address decoder, column address decoder, and command decoder), various comparators (e.g., data comparator and address comparator), various controllers (e.g., controller and detection controller), various control logics (e.g., bank control logic and control logic), data corrector, and/or address register disclosed in the present disclosure may be implemented as processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Any functional blocks, units and/or modules described herein may be implemented using hardware components or a combination of software components and hardware component. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. the processor may be a hardware processor such as central processing unit (CPU), a multi-processor, a distributed processing system, an application specific integrated circuit (ASIC), and/or a suitable hardware processing unit. The processing device(s) may run an operating system (OS) and one or more software applications that run on the OS.

The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors, multi-core processors, distributed processing, or the like, that when executing instructions according to firmware or software configure the processing device as a special purpose computer for controlling one or more operations thereof.

Software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

Example embodiments have been described above with the aid of method steps illustrating the performance of specified functions and relationships thereof. The boundaries and sequence of these functional building blocks and method steps have been defined herein for convenience of description. Alternate boundaries and sequences can be defined, so long as the specified functions and relationships are appropriately performed. Any such alternate boundaries or sequences are thus within the scope and spirit of the claims.

What is claimed is:

1. An operating method of a storage device which includes a non-volatile memory device including a memory region and an E-fuse region and a storage controller, the method comprising:

providing, by the storage controller, the non-volatile memory device with a first command indicating a target memory operation of user data;

performing, by the non-volatile memory device, the target memory operation in the memory region based on the first command and first setting information stored in the E-fuse region;

providing, by the non-volatile memory device, the storage controller with a first response indicating a failure of the target memory operation;

providing, by the storage controller, the non-volatile memory device with a second command indicating an initialization operation of the E-fuse region based on the first response;

updating, by the non-volatile memory device, the first setting information of the E-fuse region based on the second command, so as to be changed to second setting information; and providing, by the non-volatile memory device, the storage controller with a second response indicating that the E-fuse region is updated.

2. The method of claim 1, further comprising:

providing, by the storage controller, the non-volatile memory device with a third command indicating the target memory operation based on the second response; and again performing, by the non-volatile memory device, the target memory operation based on the third command and the second setting information of the E-fuse region.

3. The method of claim 1, wherein the updating of the first setting information of the E-fuse region based on the second command by the non-volatile memory device includes:

performing, by the non-volatile memory device, a read operation of initial setting information stored in the memory region based on the second command;

loading, by the non-volatile memory device, the second setting information among the initial setting information to the E-fuse region; and updating, by the non-volatile memory device, the first setting information of the E-fuse region based on the second setting information, so as to be changed to the second setting information.

4. The method of claim 3, further comprising:

resetting, by the storage controller, an input/output mode between the storage controller and the non-volatile memory device based on the second response; and updating, by the storage controller, context information stored in the storage controller based on the second response, wherein the context information indicates a condition which is necessary for the non-volatile memory device to perform the target memory operation.

5. The method of claim 1, wherein an internal memory device of the storage controller is configured to store the second setting information as backup data before the first command is generated, and wherein the second command includes the backup data.

6. The method of claim 5, wherein the non-volatile memory device is further configured to perform an initialization operation of the non-volatile memory device before the second setting information is stored as the backup data, and wherein the E-fuse region stores the second setting information immediately after the initialization operation of the non-volatile memory device is completed.

7. The method of claim 5, further comprising:

updating, by the storage controller, context information stored in the storage controller based on the second response, wherein the context information indicates a condition which is necessary for the non-volatile memory device to perform the target memory operation.

8. The method of claim 1, wherein the non-volatile memory device includes:

a plurality of memory blocks providing the memory region; and a plurality of E-fuse circuits providing the E-fuse region.

9. The method of claim 1, wherein the target memory operation indicates a read operation, a write operation, or an erase operation of the user data, and wherein the first setting information includes information about a read voltage level used in the target memory operation.

10. The method of claim 1, wherein the failure of the target memory operation is caused by a soft error coming from neutrons.

11. An operating method of a storage controller which communicates with a non-volatile memory device, the method comprising, providing the non-volatile memory device with a first command indicating a target memory operation of user data in a memory region of the non-volatile memory device;

receiving a first response indicating a failure of the target memory operation, from the non-volatile memory device;

providing the non-volatile memory device with a second command indicating initialization of an E-fuse region of the non-volatile memory device based on the first response; and receiving a second response indicating that the E-fuse region is updated, from the non-volatile memory device.

12. The method of claim 11, further comprising:

providing the non-volatile memory device with a third command indicating the target memory operation based on the second response.

13. The method of claim 11, wherein the second command indicates a read operation of initial setting information stored in the memory region of the non-volatile memory device.

14. The method of claim 11, wherein an internal memory device of the storage controller is configured to store, as backup data, setting information stored in the E-fuse region before the first command is generated, and wherein the second command includes the backup data.

15. The method of claim 14, wherein the storage controller is configured to provide the non-volatile memory device with a command indicating an initialization operation of the non-volatile memory device before the setting information stored in the E-fuse region is stored as the backup data.

16. The method of claim 11, wherein the non-volatile memory device includes:

a plurality of memory blocks providing the memory region; and a plurality of E-fuse circuits providing the E-fuse region.

17. The method of claim 11, wherein the failure of the target memory operation is caused by a soft error coming from neutrons.

18. A storage device comprising:

a storage controller; and a non-volatile memory device, wherein the storage controller is configured to provide the non-volatile memory device with a first command indicating a target memory operation of user data, wherein the non-volatile memory device includes a memory region and an E-fuse region and is configured to perform the target memory operation in the memory region based on first setting information stored in the E-fuse region, wherein the storage controller is further configured to:

receive a first response indicating a failure of the target memory operation, from the non-volatile memory device; and provide the non-volatile memory device with a second command indicating an initialization operation of the E-fuse region based on the first response, and wherein the non-volatile memory device is further configured to:

update the first setting information of the E-fuse region based on the second command, so as to be changed to second setting information; and

provide the storage controller with a second response indicating that the E-fuse region is updated.

19. The storage device of claim 18, wherein the storage controller is further configured to:

provide the non-volatile memory device with a third command indicating the target memory operation based on the second response, and wherein the non-volatile memory device is further configured to:

again perform the target memory operation based on the third command and the second setting information of the E-fuse region.

20. The storage device of claim 18, wherein the non-volatile memory device is further configured to:

perform a read operation of initial setting information stored in the memory region based on the second command;

load the second setting information associated with the E-fuse region from among the initial setting information to the E-fuse region; and update the first setting information of the E-fuse region based on the second setting information, so as to be changed to the second setting information.

\* \* \* \* \*